(12) United States Patent
Bauman et al.

(10) Patent No.: US 7,583,735 B2
(45) Date of Patent: Sep. 1, 2009

(54) METHODS AND SYSTEMS FOR HANDLING UNDERFLOW AND OVERFLOW IN A SOFTWARE DEFINED RADIO

(75) Inventors: Donald R. Bauman, Waseca, MN (US); Jeffrey J. Cannon, St. Louis Park, MN (US); John M. Hedin, Coon Rapids, MN (US); Santosh K. Sonbarse, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 523 days.

(21) Appl. No.: 11/095,150

(22) Filed: Mar. 31, 2005

(65) Prior Publication Data

US 2006/0222087 A1    Oct. 5, 2006

(51) Int. Cl.
*H04L 27/00* (2006.01)
(52) U.S. Cl. ............... 375/259; 375/219; 370/341; 370/342; 370/332; 370/321; 370/347; 340/573
(58) Field of Classification Search ......... 375/259, 375/219; 370/341, 342, 332, 321, 347; 340/573
See application file for complete search history.

(56) References Cited

U.S. PATENT DOCUMENTS

| | | | |
|---|---|---|---|
| 4,183,054 A | 1/1980 | Patisaul et al. | |
| 4,569,042 A | 2/1986 | Larson | |
| 4,611,323 A | 9/1986 | Hessenmüller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,184,347 A | 2/1993 | Farwell et al. | |

(Continued)

FOREIGN PATENT DOCUMENTS

EP    0391597    10/1990

(Continued)

OTHER PUBLICATIONS

U.S. Appl. No. 11/095,628, Toms et al.

(Continued)

*Primary Examiner*—David C Payne
*Assistant Examiner*—Zewdu Kassa
(74) *Attorney, Agent, or Firm*—Fogg & Powers LLC (57) ABSTRACT

Systems and methods for handling buffer overflows and underflows in a software defined radio are presented. A communications system comprises one or more radio head interface modules and a call processing software module. The radio head interface modules are adapted to communicate with the call processing software module. The call processing software module performs modulation and demodulation of voice and data streams and transmits complex RF data samples to the radio head interface modules. A first radio head interface module is adapted to create zero value data samples when complex RF data samples are not received from the call processing software module at an expected data sample rate. The first radio head interface module is further adapted to count zero value data samples created and discard a number of complex RF data samples based on the number of zero value data samples counted by the first radio head interface module.

24 Claims, 6 Drawing Sheets

U.S. PATENT DOCUMENTS

| | | | |
|---|---|---|---|
| 5,193,109 A | 3/1993 | Chien-Yeh Lee | |
| 5,243,598 A | 9/1993 | Lee | |
| 5,276,691 A | 1/1994 | Kivari | |
| 5,321,849 A | 6/1994 | Lemson | |
| 5,339,184 A | 8/1994 | Tang | |
| 5,544,222 A | 8/1996 | Robinson et al. | |
| 5,619,504 A | 4/1997 | Van Grinsven et al. | |
| 5,649,000 A | 7/1997 | Lee et al. | |
| 5,701,294 A | 12/1997 | Ward et al. | |
| 5,809,422 A | 9/1998 | Raleigh et al. | |
| 5,854,978 A | 12/1998 | Heidari | |
| 5,881,063 A | 3/1999 | Bement et al. | |
| 5,896,574 A | 4/1999 | Bass, Sr. | |
| 5,970,069 A | 10/1999 | Kumar et al. | |
| 5,978,688 A * | 11/1999 | Mullins et al. | 455/557 |
| 6,021,446 A | 2/2000 | Gentry, Jr. | |
| 6,047,002 A | 4/2000 | Hartmann et al. | |
| 6,091,765 A | 7/2000 | Pietzold, III et al. | |
| 6,097,733 A | 8/2000 | Basu et al. | |
| 6,188,898 B1 | 2/2001 | Phillips | |
| 6,219,561 B1 | 4/2001 | Raleigh | |
| 6,222,830 B1 | 4/2001 | Padovani et al. | |
| 6,233,456 B1 | 5/2001 | Schiff et al. | |
| 6,275,877 B1 | 8/2001 | Duda | |
| 6,363,421 B2 | 3/2002 | Barker et al. | |
| 6,381,289 B1 | 4/2002 | Dutta | |
| 6,434,366 B1 | 8/2002 | Harrison et al. | |
| 6,463,060 B1 | 10/2002 | Sato et al. | |
| 6,496,546 B1 | 12/2002 | Allpress et al. | |
| 6,501,785 B1 | 12/2002 | Chang et al. | |
| 6,544,428 B1 | 4/2003 | Higashi | |
| 6,584,146 B2 | 6/2003 | Bose et al. | |
| 6,633,545 B1 | 10/2003 | Milbrandt | |
| 6,636,747 B2 | 10/2003 | Harada et al. | |
| 6,715,007 B1 * | 3/2004 | Williams et al. | 710/52 |
| 6,728,228 B1 | 4/2004 | Ostman et al. | |
| 6,731,947 B2 | 5/2004 | Hoagland et al. | |
| 6,751,187 B2 | 6/2004 | Walton et al. | |
| 6,760,882 B1 | 7/2004 | Gesbert et al. | |
| 6,775,303 B1 | 8/2004 | Rustad et al. | |
| 6,775,305 B1 | 8/2004 | Delvaux | |
| 6,788,961 B2 | 9/2004 | Repice et al. | |
| 6,801,975 B1 | 10/2004 | Young | |
| 6,810,270 B1 | 10/2004 | Grohn et al. | |
| 6,829,229 B1 * | 12/2004 | Palermo et al. | 370/347 |
| 6,876,864 B1 | 4/2005 | Chapin | |
| 6,882,851 B2 | 4/2005 | Sugar et al. | |
| 6,889,354 B2 | 5/2005 | Feldman et al. | |
| 6,898,721 B2 | 5/2005 | Schmidt | |
| 6,912,228 B1 | 6/2005 | Dahlman et al. | |
| 6,931,074 B1 | 8/2005 | Palermo et al. | |
| 6,944,449 B1 | 9/2005 | Gandhi et al. | |
| 6,957,086 B2 | 10/2005 | Bahl et al. | |
| 6,977,930 B1 | 12/2005 | Epps et al. | |
| 7,006,442 B1 | 2/2006 | Abe et al. | |
| 7,016,668 B2 | 3/2006 | Vaidyanathan et al. | |
| 7,035,932 B1 | 4/2006 | Dowling | |
| 7,058,789 B2 | 6/2006 | Henderson et al. | |
| 7,069,574 B1 | 6/2006 | Adams et al. | |
| 7,072,413 B2 | 7/2006 | Walton et al. | |
| 7,099,346 B1 | 8/2006 | Kanterakis | |
| 7,099,687 B1 | 8/2006 | Makela et al. | |
| 7,103,044 B1 | 9/2006 | Keller et al. | |
| 7,116,682 B1 | 10/2006 | Waclawsky et al. | |
| 7,151,925 B2 | 12/2006 | Ting et al. | |
| 7,190,682 B2 | 3/2007 | Shepherd et al. | |
| 7,191,262 B2 | 3/2007 | Sleeman | |
| 7,203,488 B2 | 4/2007 | Luneau | |
| 7,269,200 B2 | 9/2007 | Igarashi | |
| 7,315,571 B1 | 1/2008 | Heidari et al. | |
| 7,324,786 B2 | 1/2008 | Parker | |
| 7,373,164 B2 | 5/2008 | Iacono et al. | |
| 7,386,641 B2 | 6/2008 | Xu et al. | |
| 7,398,106 B2 | 7/2008 | Conyers et al. | |
| 7,423,988 B2 | 9/2008 | Hedin et al. | |
| 2001/0024430 A1 | 9/2001 | Sekine et al. | |
| 2001/0031621 A1 | 10/2001 | Schmutz | |
| 2001/0037395 A1 | 11/2001 | Sabat, Jr. et al. | |
| 2002/0001337 A1 | 1/2002 | Chauncey et al. | |
| 2002/0035633 A1 | 3/2002 | Bose et al. | |
| 2002/0056066 A1 | 5/2002 | Gesbert et al. | |
| 2002/0078247 A1 | 6/2002 | Lu et al. | |
| 2002/0093983 A1 | 7/2002 | Newberg et al. | |
| 2002/0169894 A1 | 11/2002 | Takla | |
| 2002/0186436 A1 | 12/2002 | Mani et al. | |
| 2002/0186674 A1 | 12/2002 | Mani et al. | |
| 2002/0187809 A1 | 12/2002 | Mani et al. | |
| 2002/0191565 A1 | 12/2002 | Mani et al. | |
| 2003/0003880 A1 | 1/2003 | Ling et al. | |
| 2003/0016701 A1 | 1/2003 | Hinson | |
| 2003/0036359 A1 | 2/2003 | Dent et al. | |
| 2003/0050098 A1 | 3/2003 | D'Agati et al. | |
| 2003/0125040 A1 | 7/2003 | Walton et al. | |
| 2003/0142649 A1 | 7/2003 | Taniguchi | |
| 2004/0001429 A1 | 1/2004 | Ma et al. | |
| 2004/0005866 A1 | 1/2004 | Igarashi | |
| 2004/0033806 A1 | 2/2004 | Daniel et al. | |
| 2004/0042387 A1 | 3/2004 | Geile | |
| 2004/0046016 A1 | 3/2004 | Becker et al. | |
| 2004/0132477 A1 | 7/2004 | Lundby et al. | |
| 2004/0156328 A1 | 8/2004 | Walton et al. | |
| 2004/0156449 A1 | 8/2004 | Bose et al. | |
| 2004/0198410 A1 | 10/2004 | Shepherd et al. | |
| 2004/0198453 A1 | 10/2004 | Cutrer et al. | |
| 2004/0209580 A1 | 10/2004 | Bose et al. | |
| 2005/0002444 A1 | 1/2005 | Wei et al. | |
| 2005/0033519 A1 | 2/2005 | Fenton | |
| 2005/0041746 A1 | 2/2005 | Rosen et al. | |
| 2005/0083876 A1 | 4/2005 | Vialen et al. | |
| 2005/0138383 A1 | 6/2005 | Vainstein | |
| 2005/0147024 A1 | 7/2005 | Jung et al. | |
| 2005/0190855 A1 | 9/2005 | Jin et al. | |
| 2005/0280564 A1 * | 12/2005 | Lee | 341/61 |
| 2006/0015674 A1 * | 1/2006 | Murotake | 711/101 |
| 2006/0034242 A1 | 2/2006 | Proctor, Jr. | |
| 2006/0141957 A1 | 6/2006 | Fischer et al. | |
| 2006/0206628 A1 | 9/2006 | Erez | |
| 2006/0222054 A1 | 10/2006 | Conyers et al. | |
| 2006/0227736 A1 | 10/2006 | Conyers et al. | |
| 2007/0032241 A1 | 2/2007 | Busch et al. | |
| 2008/0025211 A1 | 1/2008 | Karaoguz et al. | |
| 2008/0137575 A1 | 6/2008 | Conyers et al. | |
| 2008/0168199 A1 | 7/2008 | Conyers et al. | |
| 2008/0254784 A1 | 10/2008 | Hedin et al. | |

FOREIGN PATENT DOCUMENTS

| | | |
|---|---|---|
| EP | 0936453 | 8/1999 |
| EP | 1211817 | 6/2002 |
| WO | 9115927 | 10/1991 |
| WO | 0159993 | 8/2001 |
| WO | 2004047316 | 6/2004 |

OTHER PUBLICATIONS

U.S. Appl. No. 11/095,789, Hedin et al.
U.S. Appl. No. 11/094,848, Weaver et al.
U.S. Appl. No. 11/095,111, Hermel et al.
U.S. Appl. No. 11/095,112, Hedin et al.
U.S. Appl. No. 11/094,949, Hedin et al.
U.S. Appl. No. 11/095,113, Hedin et al.
U.S. Appl. No. 11/094,950, Hedin et al.
U.S. Appl. No. 11/094,947, Conyers et al.

U.S. Appl. No. 11/094,907, Conyers et al.
U.S. Appl. No. 11/095,788, Conyers et al.
U.S. Appl. No. 11/095,779, Hermel et al.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", , pp. 1171-1175, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

METHODS AND SYSTEMS FOR HANDLING UNDERFLOW AND OVERFLOW IN A SOFTWARE DEFINED RADIO

CROSS REFERENCES TO RELATED APPLICATIONS

This application is related to the following co-pending United States patent applications filed on Mar. 31, 2005, all of which are hereby incorporated herein by reference:

U.S. patent application Ser. No. 11/095,788 entitled "DYNAMIC FREQUENCY HOPPING") and which is referred to here as the '672 Application;

U.S. patent application Ser. No. 11/095,628 entitled "DYNAMIC DIGITAL UP AND DOWN CONVERTERS") and which is referred to here as the '673 Application;

U.S. patent application Ser. No. 11/095,789 entitled "DYNAMIC RECONFIGURATION OF RESOURCES THROUGH PAGE HEADERS") and which is referred to here as the '675 Application;

U.S. patent application Ser. No. 11/094,848 entitled "SIGNAL ENHANCEMENT THROUGH DIVERSITY") and which is referred to here as the '676 Application;

U.S. patent application Ser. No. 11/095,111 entitled "SNMP MANAGEMENT IN A SOFTWARE DEFINED RADIO") and which is referred to here as the '677 Application;

U.S. patent application Ser. No. 11/095,112 entitled "TIME STAMP IN THE REVERSE PATH") and which is referred to here as the '678 Application;

U.S. patent application Ser. No. 11/094,949 entitled "BUFFERS HANDLING MULTIPLE PROTOCOLS") and which is referred to here as the '679 Application;

U.S. patent application Ser. No. 11/095,113 entitled "TIME START IN THE FORWARD PATH") and which is referred to here as the '680 Application;

U.S. patent application Ser. No. 11/094,950 entitled "LOSS OF PAGE SYNCHRONIZATION") and which is referred to here as the '686 Application;

U.S. patent application Ser. No. 11/094,947, entitled "DYNAMIC REALLOCATION OF BANDWIDTH AND MODULATION PROTOCOLS" and which is referred to here as the '684 Application;

U.S. patent application Ser. No. 11/094,907 entitled "DYNAMIC READJUSTMENT OF POWER") and which is referred to here as the '685 Application; and U.S. patent application Ser. No. 11/095,779 entitled "INTEGRATED NETWORK MANAGEMENT OF A SOFTWARE DEFINED RADIO SYSTEM") and which is referred to here as the '700 Application.

TECHNICAL FIELD

The following description relates to communication systems and in particular to wireless communication systems.

BACKGROUND

Many changes are taking place in the way wireless communication networks are being deployed. Some of the changes are being driven by the adoption of new mobile communications standards. The introduction of software defined radios to wireless telecommunications has led to the generation of software and hardware solutions to meet the new standards. Current mobile communication standards introduce physical and logical channels and pose new issues in the transport of information within the communication networks.

A software defined radio (SDR) uses software for the modulation and demodulation of radio signals. The use of reprogrammable software allows key radio parameters, such as frequency and modulation protocols to be modified without the need to alter the underlying hardware of the system. Additionally, SDRs allow a single device to support multiple configurations which previously would have required multiple hardware devices. One example of a software defined radio is the Vanu Software Radio produced by Vanu, Inc. (See U.S. Pat. No. 6,654,428).

Some modulation standards that wireless communication networks operate with include, but are not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

In standards that implement digital processing of voice and data communications, data streams typically carry digital samples of the voice and data communications in the form of digital words of a finite bit length and multiplex into a single data stream digital words comprising voice and data communications for several end users of the communications network. Often, a plurality of digital words are bundled together into groups or pages to increase the processing efficiency of communications network systems. Because of this, various network systems must maintain synchronization to ensure agreement about which digital words in a data stream belong to the same group.

When the transmission of digital words in a data stream are processed by network systems at either a slower or faster rate than expected, based on the modulation standard, then network buffers may unexpectedly empty or fill resulting in either gaps in the data stream, or lost data. One undesired consequence of unexpectedly empty or filled buffers is the loss of synchronization between components within the communications network.

For the reasons stated above, and for other reasons stated below that will become apparent to those skilled in the art upon reading and understanding the present specification, there is a need in the art today for methods and systems for handling buffer underflows and overflows while maintaining synchronization between system components.

SUMMARY

Embodiments of the present invention address the problem of handling buffer underflows and overflows, as well as other problems and will be understood by reading and studying the following specification.

In one embodiment, a communications system is provided. The system comprises one or more radio head interface modules and a call processing software module. The one or more radio head interface modules are adapted to communicate with the call processing software module. The call processing software module performs modulation and demodulation of voice and data streams using one or more air interface standards and the call processing software module transmits complex RF data samples to the one or more radio head interface modules. A first radio head interface module of the one or more radio head interface modules is adapted to create zero value data samples when complex RF data samples are not received from the call processing software module at an expected data sample rate. The first radio head interface module is further adapted to count the number of zero value data samples created and further adapted to discard a number of complex RF data samples received from the call processing software module based on the number of zero value data samples counted by the first radio head interface module.

In another embodiment, a method of handling buffer underflow conditions is provided. The method comprises attempting transferring one or more complex RF data samples from a transmit buffer; determining if the transmit buffer is detecting an empty buffer; inserting one or more zero value data samples into a data stream at a first rate; counting the number of zero value data samples inserted into the data stream; and when the number of inserted zero value data samples is less than a predefined number, discarding one or more complex RF data samples from the data stream at a second rate, based on the number of zero value data samples inserted into the data stream.

In yet another embodiment, a computer-readable medium having computer-executable instructions for a method of handling buffer overflow conditions is provided. The method comprises attempting sending one or more complex RF data samples to a receive buffer; determining if the receive buffer is full; when the receive buffer is full, discarding one or more complex RF data samples from a data stream; and when the receive buffer is no longer full, continuing attempting sending one or more complex RF data samples to a receive buffer.

In still yet another embodiment a communications system is disclosed. The system comprises means for modulating and demodulating voice and data streams using one or more air interface standards and communicating complex RF data samples at a first data sample rate; means for creating zero value data samples when complex RF data samples are not received from the means for modulating and demodulating voice and data streams at the first data sample rate; means for counting the number of zero value data samples created; and means for discarding a number of complex RF data samples communicated by the means for modulating and demodulating voice and data streams based on the number of zero value data samples created.

DRAWINGS

The present invention is more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention concern portions of a cellular telecommunications network that typically comprises cellular antennas, a radio head transmitting and receiving voice and/or data communications over the cellular antennas, and a base station (also commonly called a base transceiver station (BTS), or a server) that communicates voice and data signals between the radio head and a larger communication network (e.g. the public switched telephone network, or the Internet). One or more base stations are connected to a base station controller (BSC) which controls data communication flow in one or more connected base stations.

In some embodiments, communications between a BTS and a remote unit take place through two sets of data. Typically, forward logical channels carry data from the BTS through the radio head to an end user device. Reverse logical channels carry data from end user devices through the radio head to the BTS. Each logical channel is assigned a radio frequency (RF) channel and a modulation protocol, which the communications network uses to wirelessly communicate data with individual cellular devices.

Embodiments of the present invention provide methods and systems for handling overflow and underflow conditions in an SDR network hardware such as a mobile communications system.

Figure 1A:
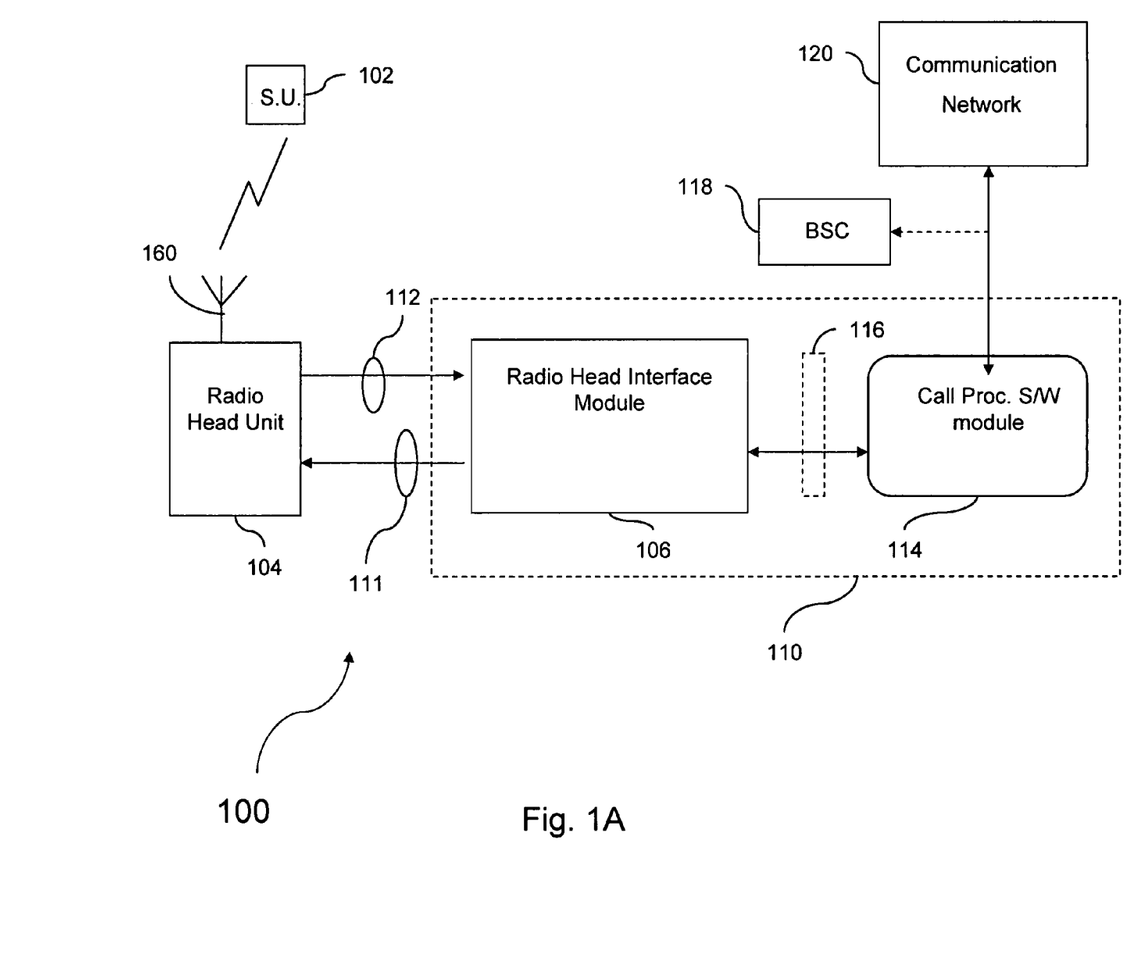
FIG. 1A is a block diagram of one embodiment of a communications system.
Figure 1B:
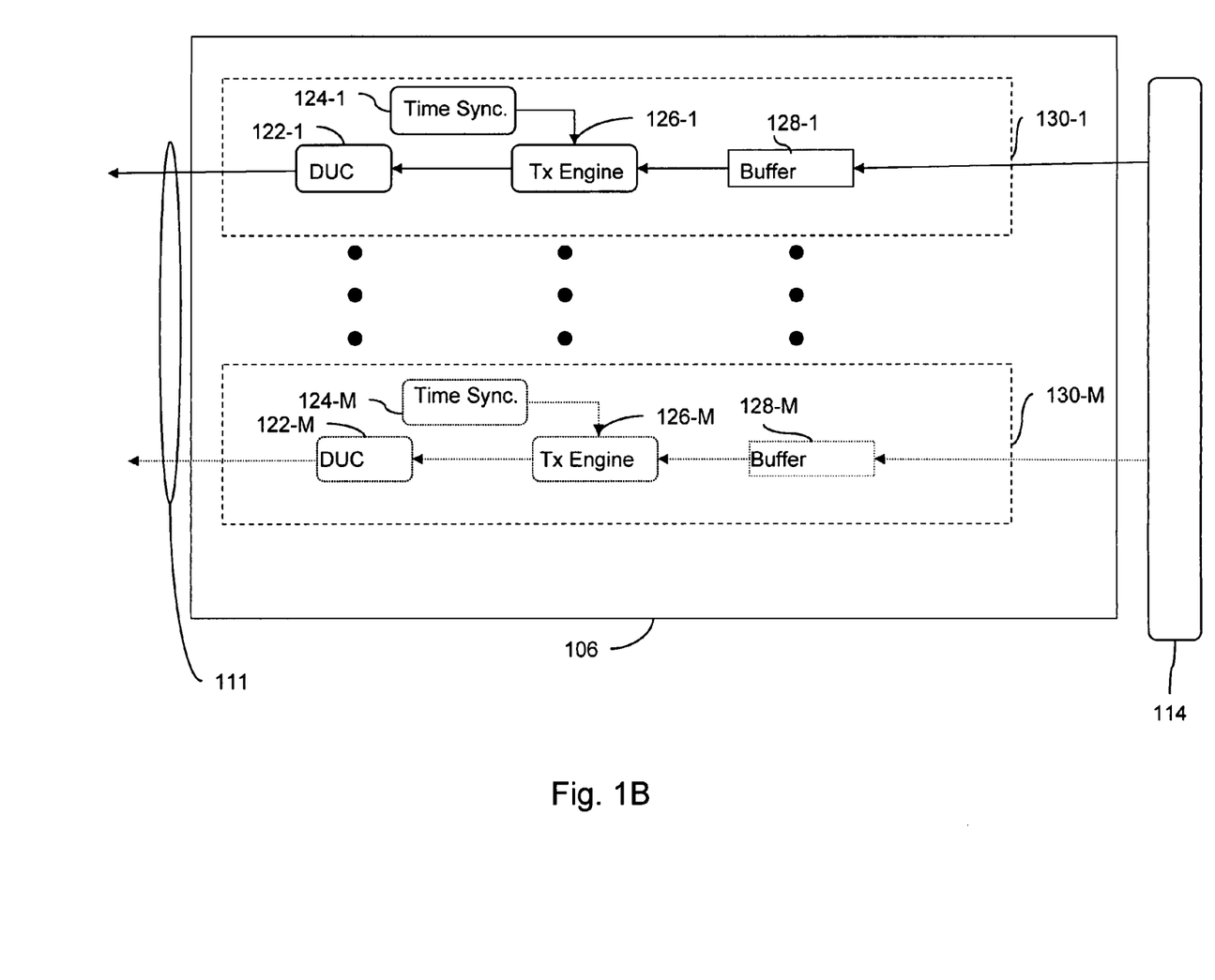
FIG. 1B is an illustration of one embodiment of a forward logical channel for a communications system.
Figure 1C:
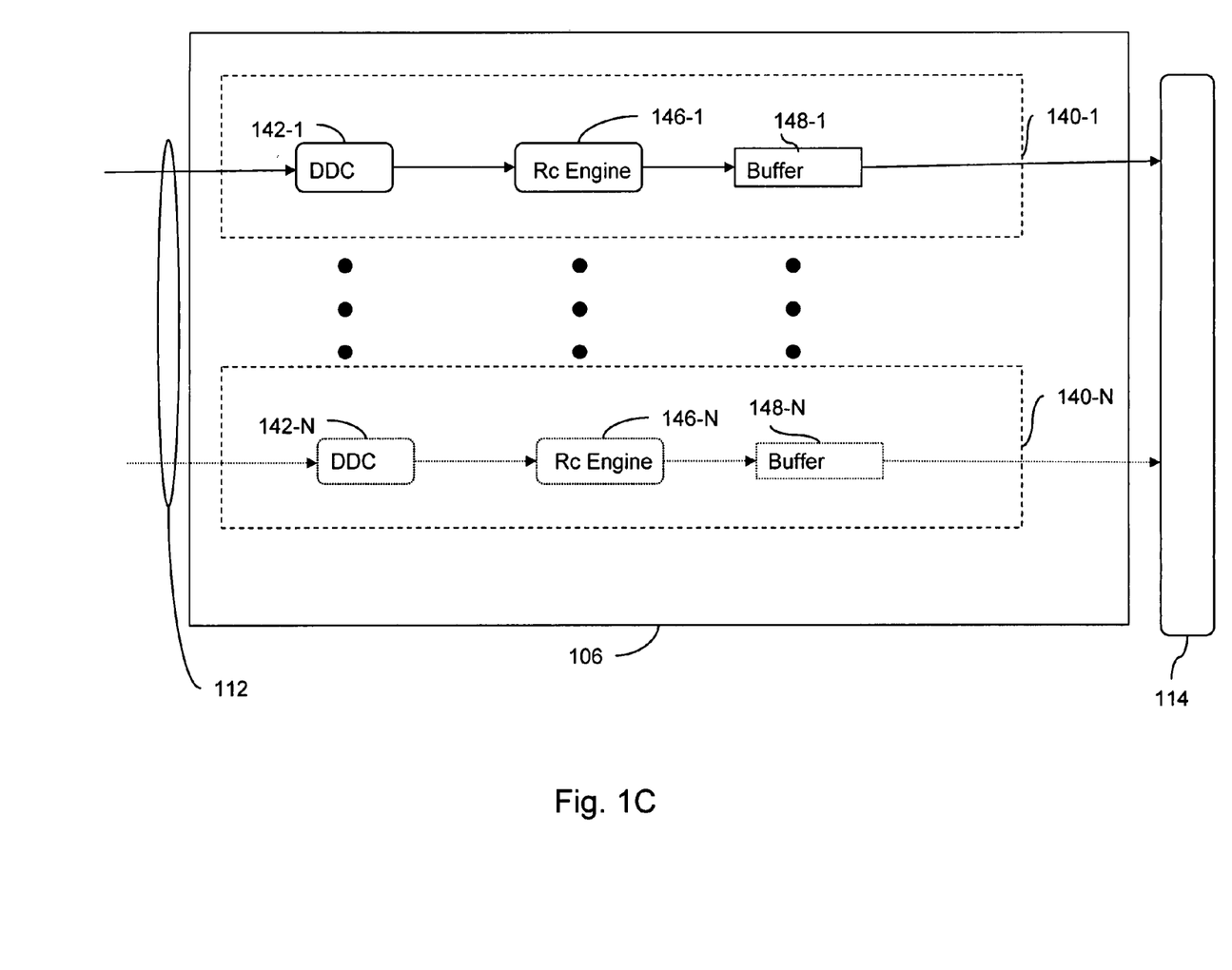
FIG. 1C is an illustration of one embodiment of a reverse logical channel for a communications system.

FIGS. 1A, 1B and 1C are block diagrams of one embodiment of a communication system shown generally at 100. Communication system 100 includes one or more subscriber units 102 (or mobile devices 102) within a service area of a radio head unit 104. Radio head unit 104 is coupled to one or more servers 110 (or BTS 110) over one or more transport mediums 111, and 112. BTS 110 is connected to one or more communication networks 120 (e.g. public switched telephone network (PSTN), Internet, a cable network, or the like). In one embodiment, BTS 110 is connected to one or more communication networks through a base station controller (BSC) 118. Cellular antennas 160, adapted for receiving cellular signals from one or more subscriber units 102, are coupled to radio head unit 104. In one embodiment, network 100 is a bidirectional network and as shown includes equipment for forward links (i.e. transmissions on forward logical channels from communications network 120 to mobile device 102) and reverse links (i.e. transmissions on reverse logical channels from mobile device 102 to communications network 120). BTS 110 includes a call processing software module 114 (or call processing software 114) that interfaces with one or more communication networks 120. Call processing software module 114 also includes programming which implements an SDR with the BTS 110 and radio head unit 104 hardware, digitally performing waveform processing to modulate and demodulate radio signals transmitted and received, respectively, from the cellular antennas 160. In one embodiment, call processing software module 114 is a Vanu, Inc., Vanu Software Radio.

In some embodiments, additional reverse links are also provided for duplicate reverse logical channels. In some embodiments, this set of duplicate reverse logical channels are called diversity channels. It should be understood that descriptions in this specification relating to embodiments of reverse logical channels also apply to such diversity channels. Further details pertaining to diversity channels are provided in the '676 Application incorporated herein by reference.

In one embodiment, BTS 110 and call processing software module 114 communicate with radio head unit 104 through a radio head interface module 106 (or radio head interface 106). Radio head interface 106 establishes high speed digital communication paths for two or more sets of base band data stream logic channels (i.e. forward logical channels, reverse logical channels and diversity channels) and all communication between BTS 110 and radio head unit 104 goes through radio head interface 106.

In one embodiment, radio head interface module 106 is coupled to BTS 110 through an interface device 116. In one embodiment, interface device 116 is one of, but not limited to a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface or a high speed parallel interface.

Radio head interface module 106, radio head unit 104, and call processing software module 114, all handle multiple types of modulation protocols, and in different embodiments, one or more of the logical channels transmit data using a different modulation protocol than another logical channel. In one embodiment, radio head interface module 106, radio head unit 104, and call processing software module 114, handle modulation protocols for one or more of, but not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), Orthogonal Frequency Division Multiplexing (OFDM), or any other appropriate modulation protocol. A modulation protocol is commonly also referred to as an air interface standard, a modulation standard, an air interface protocol, or an air interface modulation protocol. For each logical channel, call processing software module 114 performs modulation and demodulation of forward and reverse logic channel voice and data streams using one or more air interface standard protocols.

In one embodiment, in the forward link, call processing software module 114 compiles voice and data information from communication networks 120 into collections of complex RF data samples. In one embodiment the collection of complex RF data samples forms a page of complex RF data samples wherein each page contains data samples for one forward logical channel. FIG. 1B illustrates one embodiment of a forward logic channel 130-1 data path. A radio head interface forward logic channel 130-1 comprises a transmit buffer 128-1, a transmit engine 126-1, a digital upconverter (DUC) 122-1 and a time synchronizer 124-1. In operation, in one embodiment, transmit buffer 128-1 receives a page of complex data samples from call processing software 114. Transmit engine 126-1 removes the page of complex RF data samples from the transmit buffer 128-1 and sends the data samples to DUC 122-1. The transfer rate of complex RF data samples is a function of the modulation protocol assigned to logical channel 130-1. In one embodiment, transmit engine 126-1 holds a page of complex data samples in transmit buffer 128-1 until time synchronizer 124-1 indicates that it is time to start transmitting the page of complex data samples to DUC 122-1.

In normal operation, call processing software module 114 is expected to write pages of complex RF data samples sufficiently often so that transmit buffer 128-1 is never empty. In the unexpected case that call processing software module 114 is late in writing a page of complex RF data samples to transmit buffer 128-1, then transmit buffer 128-1 may be empty, or contain an incomplete page of data samples, resulting in a buffer underflow fault.

In embodiments of the present invention, when a buffer underflow occurs, radio head interface module 106 creates one zero value complex RF data sample for each complex RF data sample missing from transmit buffer 128-1, so that page synchronization is not lost. Transmit engine 126-1 transmits the zero value complex RF data samples to DUC 122-1 in place of the missing data samples at a rate equal to the data sample rate assigned to logical channel 130-1 and counts the number of zero value data samples created. To compensate for the added zero value data samples, when complex RF data samples are again available from transmit buffer 128-1, radio head interface module 106 discards one valid complex RF data sample from transmit buffer 128-1 for every zero value sample that was added. By creating a zero value sample to compensate for each missing complex RF data sample and discarding an equal number of valid complex RF data samples, synchronization is maintained because the expected occurrence of a new page start within the data stream is maintained. For example in one embodiment, every 258th quadword handled by transmit engine 126-1 should contain a start of page indicator within a page header. Insertion of the zero value samples into the data stream does not alter the expectation that every 258th quadword shall contain the start of page indicator. Additional details concerning quadwords, page synchronization and start of page indicators are provided in the '681 Application herein incorporated by reference.

When non-discarded complex RF data samples are again available from transmit buffer 128-1, transmit engine 126-1 resumes transmitting valid complex RF data samples from transmit buffer 128-1 to DUC 122-1. In one embodiment, the discarded valid complex RF data samples are discarded at a rate much higher than the data sample rate assigned to logical channel 130-1. In one embodiment, radio head interface module 106 continues to create and include zero value samples into the data stream at the data sample rate assigned to logical channel 130-1, while simultaneously discarding valid complex RF data samples, until the total number of discarded valid complex RF samples equals the total number of zero value data samples inserted into the data stream. In one embodiment, radio head interface module 106 notifies call processing software module 114 when an underflow fault occurs.

In one embodiment, when the number of zero value samples created equals the total number of valid complex RF data samples expected in a single page of complex RF data samples, then call processing software 114 is notified of an "underflow recovery fault" by radio head interface module 106. When an underflow recovery fault occurs, underflow processing as described above is suspended. That is, further underflow detection is stopped. Radio head interface module 106 continues creating and sending zero value data samples to DUC 122-1, but resets the zero value data sample count to zero and does not continue counting the number of zero value data samples inserted into the data stream. Call processing software module 114 will then provide radio head interface module 106 with Time Start data indicating the time at which radio head interface module 106 should resume the normal processing of valid complex RF data samples from transmit buffer 128-1. In one embodiment, normal processing of valid complex RF data samples resumes when the time indicated by a time synchronizer 124-1 equals the Time Start. At the time indicated by the Time Start, underflow detection is also resumed. In one embodiment, the Time Start data is contained within a page header of a page of complex RF data samples contained within transmit buffer 128-1. Additional details pertaining to page headers and Time Start indicators are provided in the '675 Application herein incorporated by reference. In contrast to an underflow fault, it is not necessary to discard valid complex RF data samples to recover following an underflow recover fault because synchronization is maintained through recommencing complex RF data sample transmission at the beginning of a page of complex RF data samples.

In other embodiments, radio head interface 106 comprises a plurality of M forward logical channels 130-1 through 130-M each having transmit buffers 128-1 through 128-M, transmit engines 126-1 through 126-M, DUCs 122-1 through 122-M and time synchronizers 124-1 through 124-M, each logical channel processing underflow conditions as described above. Additional details on the operation of digital upconverters are provided in the '673 Application incorporated herein by reference. Additional details pertaining to page headers are provided in the '675 Application incorporated herein by reference. Additional details pertaining to page resynchronization are provided in the '681 Application incorporated herein by reference.

FIG. 1C illustrates one embodiment of a reverse logic channel 140-1 data path. A radio head interface reverse logic channel comprises a receive buffer 148-1, a receive engine 146-1, and a digital down converter (DDC) 142-1. In normal operation, in one embodiment, receive engine 146-1 receives complex RF data samples from DDC 142-1 and sends the complex RF data samples to receive buffer 148-1. In one embodiment, as receive buffer 148-1 receives the complex RF data samples, a page of complex RF data samples is formed in receive buffer 148-1. In one embodiment, when the page of complex RF data samples is completed, receive engine 146-1 inserts a page header into receive buffer 148-1 with the complex RF data samples and the page is transmitted by radio head interface module 106 to call processing software module 114. The transfer rate of complex RF data samples is a function of the modulation protocol assigned to logical channel 140-1. In other embodiments, radio head interface 106 comprises a plurality of N reverse logical channels 140-1 through 140-N each having receive buffers 148-1 through 148-N, receive engines 146-1 through 146-N, and DDCs 142-1 through 142-N, each processing data sample pages as described above. Additional details pertaining to digital downconverters are provided in the '673 Application herein incorporated by reference.

In normal operation, call processing software module 114 is expected to read and remove pages of complex RF data samples from receive buffer 148-1 sufficiently often so that receive buffer 148-1 is never full. In the unexpected case that call processing software module 114 is late in reading a page of complex RF data samples from receive buffer 148-1, then receive buffer 148-1 may be full when receive engine 146-1 attempts to send complex RF data samples. This results in a in a buffer overflow fault.

In embodiments of the present invention, when a buffer overflow occurs, radio head interface module 106 discards complex RF data samples from DDC 142-1 until receive buffer 148-1 is no longer full and can accept additional complex RF data samples. In one embodiment, radio head interface 106 notifies call processing software module 114 of the overflow fault condition. Page synchronization is maintained by the present invention because a page of complex RF data samples is formed in receive buffer 148-1 only as room in receive buffer 148-1 becomes available to accommodate incoming complex RF data samples.

Figure 2:
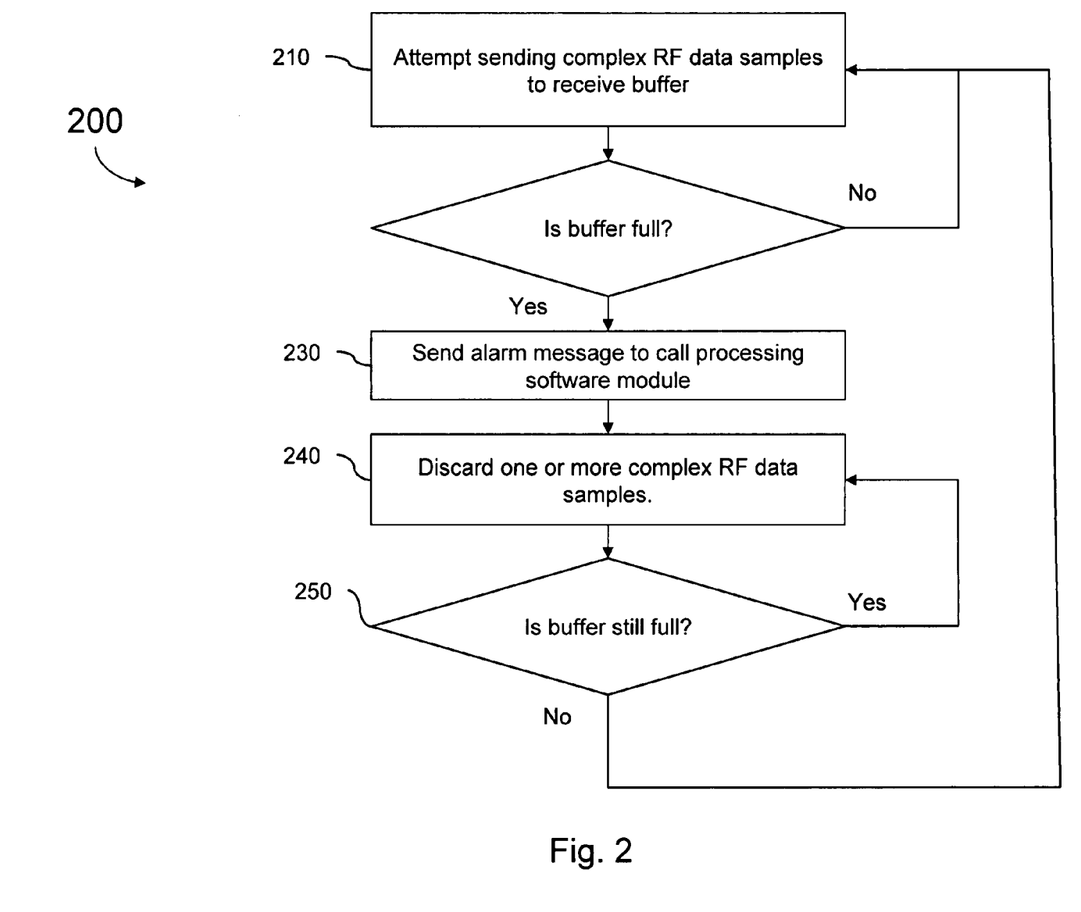
FIG. 2 is a flow chart of one embodiment of a method of handling buffer overflow conditions

FIG. 2 is a flowchart illustrating a method of handling buffer overflow conditions 200 of one embodiment of the present invention. The method comprises attempting to send complex RF data samples to a receive buffer (210). In one embodiment, when the buffer is full, the method proceeds with sending a fault alarm message to a call processing software module (230) and discarding one or more complex RF data samples (240). When the buffer is still full, the method repeats discarding one or more complex RF data samples from a data stream (240) until the receive buffer is no longer full and can accept additional complex RF data samples. The method then continues by attempting to send complex RF data samples to a receive buffer (210).

Figure 3A:
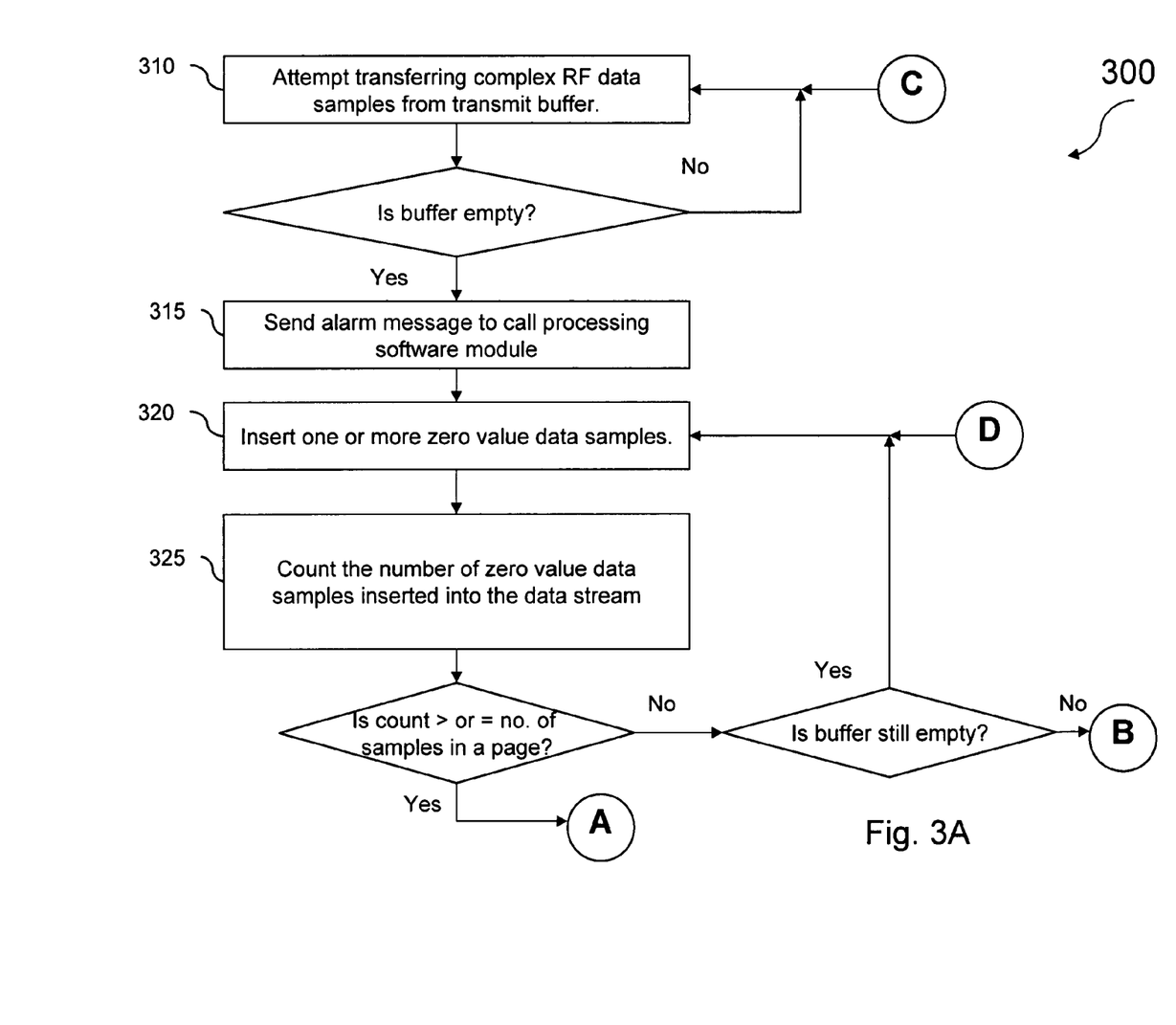
FIGS. 3A and 3B are a flow chart of one embodiment of a method of handling buffer underflow conditions.
Figure 3B:
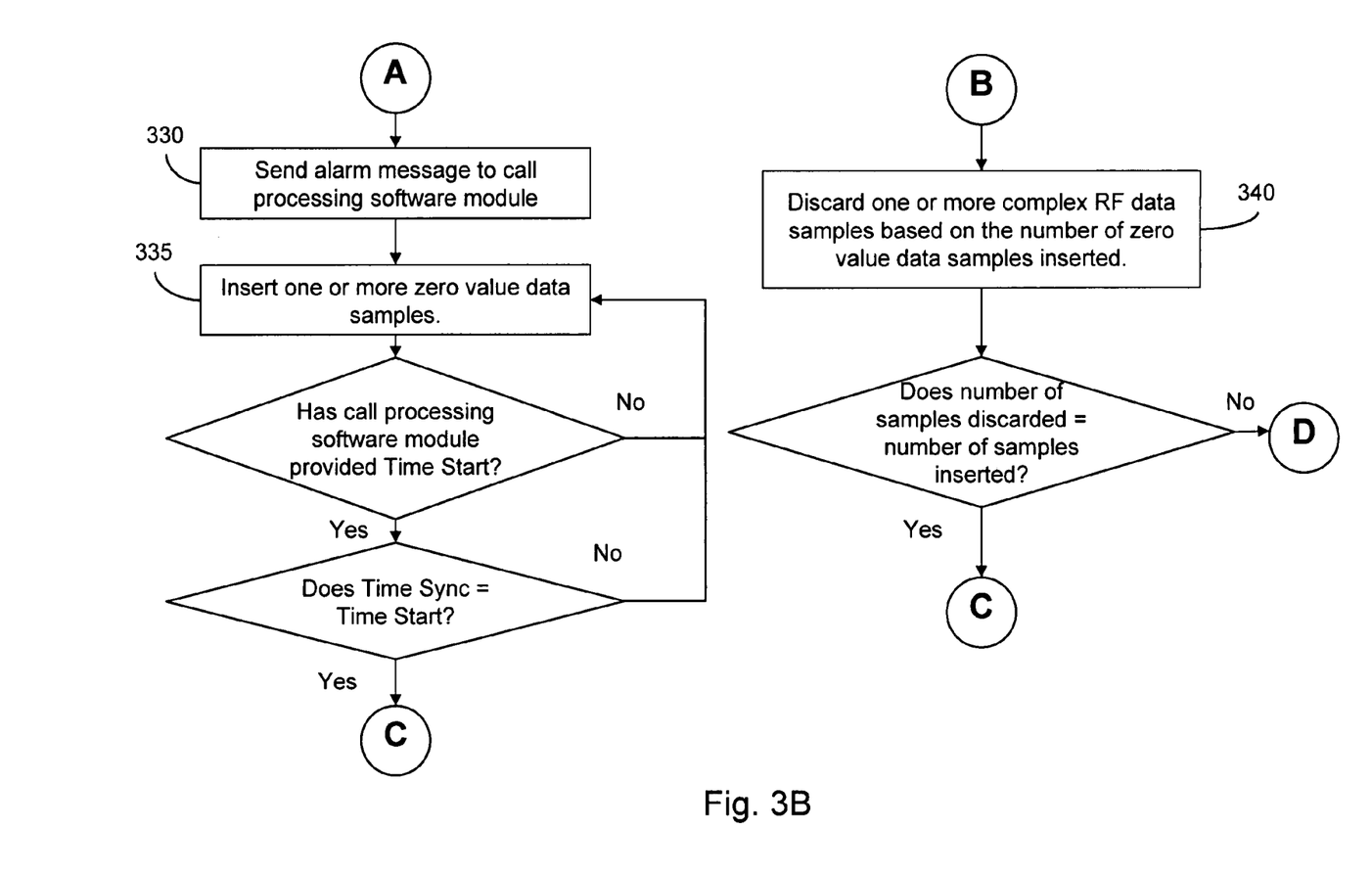

FIGS. 3A and 3B are a flowchart illustrating a method of handling buffer underflow conditions 300 of one embodiment of the present invention. The method comprises attempting to transfer complex RF data samples from a transmit buffer (310). When the buffer is empty, the method proceeds with sending a fault alarm message to a call processing software module (315); inserting one or more zero value data samples into a data stream at a first rate (320); and counting the number of zero value data samples inserted into the data stream (330). When the number of zero value data samples inserted into the data stream is less than the number of complex RF data samples in a page of complex RF data samples, and the transmit buffer is still empty, the method returns to inserting one or more zero value data samples into a data stream at a first rate (320).

When the number of zero value data samples inserted into the data stream is less than the number of complex RF data samples in a page of complex RF data samples, but the transmit buffer is not empty, the method proceeds with discarding one or more complex RF data samples from the data stream at a second rate based on the number of zero value data samples inserted into the data stream (340). When the number the number of complex RF data samples discarded equals the number of zero value data samples inserted, the method resumes attempting to transfer complex RF data samples from the transmit buffer (310). When the number of complex RF data samples discarded is less than the number of zero value data samples inserted, the method continues with inserting one or more zero value data samples into a data stream at a first rate (320).

When the number of zero value data samples inserted into the data stream is less than the number of complex RF data samples in a page of complex RF data samples, and the transmit buffer is still empty, the method proceeds with sending an underflow recovery fault alarm message to the call processing software module (330) and inserting one or more zero value data samples (335). The method continues inserting one or more zero value data samples (335) until the call processing software module provides a Time Start and the current time indicated by a time synchronizer equals the time indicated by the Time Start. When the current time indicated by a time synchronizer equals the time indicated by the Time Start, the method then resumes with attempting to transfer complex RF data samples from the transmit buffer (310).

Several ways are available to implement the radio head interface module and server elements of the current invention. These include, but are not limited to, digital computer systems, programmable controllers, or field programmable gate arrays. Therefore other embodiments of the present invention are the program instructions resident on computer readable media which when implemented by such controllers, enable the controllers to implement embodiments of the present invention. Computer readable media include any form of computer memory, including but not limited to punch cards, magnetic disk or tape, any optical data storage system, flash ROM, non-volatile ROM, PROM, E-PROM or RAM, or any other form of permanent, semi-permanent, or temporary memory storage system or device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communications system, the system comprising:
   one or more radio head interface modules; and
   a call processing software module, the one or more radio head interface modules adapted to communicate with the call processing software module;
   wherein the call processing software module performs modulation and demodulation of voice and data streams using one or more air interface standards;
   wherein the call processing software module transmits complex RF data samples to the one or more radio head interface modules;
   a first radio head interface module of the one or more radio head interface modules adapted to create zero value data samples when complex RF data samples are not received from the call processing software module at an expected data sample rate;
   the first radio head interface module further adapted to count the number of zero value data samples created; and
   the first radio head interface module further adapted to discard a number of complex RF data samples received from the call processing software module based on the number of zero value data samples counted by the first radio head interface module;
   wherein the call processing software module transmits complex RF data samples in pages, each page including a predefined number of complex RF data samples;
   wherein, when the first radio head interface module creates a number of zero value data samples less than the predefine number of complex RF data samples in a page of complex RF data samples, the number of complex RF data samples discarded equals the number of zero value data samples created by the first radio head interface module; and
   wherein when the first radio head interface module creates a number of zero value data samples equal to the predefined number of complex RF data samples in a page of complex RF data samples, then the first radio head interface module is further adapted to continue transmitting zero value data samples until notified by the call processing software to resume transmitting complex RF data samples, wherein when the first radio head interface is notified by the call processing software to resume transmitting complex RF data samples, the first radio head interface module does not discard a number of complex RF data samples received from the call processing software module.

2. The system of claim 1, wherein, when RF data samples are not received from the call processing software module at an expected data sample rate, the first radio head interface module sends a fault message to the call processing software module.

3. The system of claim 1, further comprising:
   one or more interface devices, wherein the one or more radio head interface modules communicates with the call processing software module over the one or more interface devices.

4. The system of claim 3, wherein the one or more interface devices includes at least one of a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface and a high speed parallel interface.

5. The system of claim 1, wherein the one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

6. The system of claim 1, wherein, when the first radio head interface module creates a number of zero value data samples equal to the predefined number of complex RF data samples in a page of complex RF data samples, the first radio head interface module sends a fault message to the call processing software module.

7. The system of claim 1, wherein the first radio head interface module is further adapted to discard complex RF data samples when the call processing software is unable to receive complex RF data samples from the first radio head interface module at an expected data sample rate.

8. The system of claim 7, wherein, when the call processing software is unable to receive complex RF data samples from the first radio head interface module at an expected data sample rate, the first radio head interface module sends a fault message to the call processing software module.

9. The system of claim 7, wherein, when the receive buffer is full when the receive engine attempts to transfer complex RF data samples, the first radio head interface module sends a fault message to the call processing software module.

10. A communications system, the system comprising:
    one or more radio head interface modules; and
    a call processing software module, the one or more radio head interface modules adapted to communicate with the call processing software module;
    wherein the call processing software module performs modulation and demodulation of voice and data streams using one or more air interface standards;
    wherein the call processing software module transmits complex RF data samples to the one or more radio head interface modules;
    a first radio head interface module of the one or more radio head interface modules adapted to create zero value data samples when complex RF data samples are not received from the call processing software module at an expected data sample rate;

the first radio head interface module further adapted to count the number of zero value data samples created; and the first radio head interface module further adapted to discard a number of complex RF data samples received from the call processing software module based on the number of zero value data samples counted by the first radio head interface module;

wherein the first radio head interface module further comprises:

a transmit buffer, the transmit buffer adapted to receive the complex RF data samples from the call processing software module, the transmit buffer adapted to store the complex RF data samples as a page of complex RF data samples;

a transmit engine; and a digital upconverter;

the transmit engine adapted to transfer the complex RF data samples of the page of complex RF data samples from the transmit buffer to the digital upconverter;

the radio head interface module further adapted to create zero value data samples when the transmit buffer is empty, and further adapted to transfer the zero value data samples to the digital upconverter;

the transmit engine further adapted to discard a number of complex RF data samples received from the transmit buffer based on the number of zero value data samples counted by the first radio head interface module.

11. The system of claim 10, wherein, when the transmit buffer is empty when the transmit engine attempts to transfer the complex RF data samples of the page of complex RF data samples from the transmit buffer to the digital upconverter, the first radio head interface module sends a fault message to the call processing software module.

12. The system of claim 10, wherein the call processing software module transmits complex RF data samples in pages;

wherein the page of complex RF data samples includes a predefined number of complex RF data samples;

wherein, when the first radio head interface module creates a number of zero value data samples less than the predefine number of complex RF data samples in a page of complex RF data samples, then the number of complex RD data samples discarded equals the number of zero value data samples created by the first radio head interface module; and wherein, when the first radio head interface module creates a number of zero value data samples equal to the predefined number of complex RF data samples in the page of complex RF data samples, then the transmit engine is further adapted to continue transmitting zero value data samples to the digital upconverter until the radio head interface module is notified by the call processing software to resume transmitting complex RF data samples from the transmit buffer, wherein when the first radio head interface is notified by the call processing software to resume transmitting complex RF data samples from the transmit buffer and the transmit engine does not discard a number of complex RF data samples received from the call processing software module.

13. The system of claim 12, wherein, when the first radio head interface module creates a number of zero value data equal to the predefined number of complex RF data samples in a page of complex RF data samples, the first radio head interface module sends a fault message to the call processing software module.

14. The system of claim 10, wherein the radio head interface module further comprises:

a receive buffer;

a receive engine; and a digital downconverter;

the receive engine adapted to transfer a stream of complex RF data samples from the digital downconverter to the receive buffer, the receive buffer adapted to store the complex RF data samples as a page of complex RF data samples, the receive buffer further adapted to output the page of complex RF data samples to the call processing software;

the receive engine further adapted to discard complex RF data samples received from the digital downconverter when the receive buffer is full.

15. A method of handling buffer underflow conditions, the method comprising:

attempting to transfer one or more complex RF data samples from a transmit buffer;

determining if the transmit buffer is empty;

inserting one or more zero value data samples into a data stream at a first rate;

counting the number of zero value data samples inserted into the data stream; and when the number of inserted zero value data samples is less than a predefined number, discarding one or more complex RF data samples from the data stream at a second rate, based on the number of zero value data samples inserted into the data stream;

wherein when the number of inserted zero value data samples is not less than a predefined number, the method further comprises:

sending a fault message to a call processing software module;

receiving time start information from the call processing software module indicating a time to resume transferring complex RF data samples from the transmit buffer; and when the current time indicated by a time synchronizer equals the time indicated by the time start information, attempting transferring one or more complex RF data samples from the transmit buffer.

16. The method of claim 15 further comprising:

when the transmit buffer is empty, sending a fault message to a call processing software module.

17. The method of claim 15, wherein the number of complex RF data samples discarded equals the number of zero value data samples inserted.

18. The method of claim 15, wherein the second rate is faster than the first rate.

19. A computer-readable medium having computer-executable instructions for a method of handling buffer underflow conditions, the method comprising:

attempting to transfer one or more complex RF data samples from a transmit buffer determining if the transmit buffer is empty;

inserting one or more zero value data samples into a data stream at a first rate;

counting the number of zero value data samples inserted into the data stream; and when the number of inserted zero value data samples is less than a predefined number, discarding one or more complex RF data samples from the data stream at a second rate, based on the number of zero value data samples inserted into the data stream;

wherein when the number of inserted zero value data samples is not less than a predefined number, the method further comprises:

sending a fault message to a call processing software module;

receiving time staff information from the call processing software module indicating a time to resume transferring complex RF data samples from the transmit buffer; and when the current time indicated by a time synchronizer equals the time indicated by the time start information, attempting transferring one or more complex RF data samples from the transmit buffer.

20. The method of claim 19 further comprising:
when the transmit buffer is empty, sending a fault message to a call processing software module.

21. The method of claim 19, wherein the number of complex RF data samples discarded equals the number of zero value data samples inserted.

22. The method of claim 19, wherein the second rate is faster than the first rate.

23. A communications system, the system comprising:
means for modulating and demodulating voice and data streams using one or more air interface standards and communicating complex RF data samples at a first data sample rate;

means for creating zero value data samples when complex RF data samples are not received from the means for modulating and demodulating voice and data streams at the first data sample rate;

means for counting the number of zero value data samples created; and means for discarding a number of complex RF data samples communicated by the means for modulating and demodulating voice and data streams based on the number of zero value data samples created;

means for communicating complex RF data samples at a second data sample rate to the means for modulating and demodulating voice and data streams; and means for discarding complex RF data samples when RF data samples are not received by the means for modulating and demodulating voice and data streams at the second data sample rate.

24. The system of claim 23, wherein the one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

* * * * *

UNITED STATES PATENT AND TRADEMARK OFFICE
CERTIFICATE OF CORRECTION

| | |
|---|---|
| PATENT NO. | : 7,583,735 B2 |
| APPLICATION NO. | : 11/095150 |
| DATED | : September 1, 2009 |
| INVENTOR(S) | : Bauman et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Fourteenth Day of December, 2010

David J. Kappos
*Director of the United States Patent and Trademark Office*